(12) United States Patent
Senior et al.

(10) Patent No.: US 9,401,143 B2
(45) Date of Patent: Jul. 26, 2016

(54) CLUSTER SPECIFIC SPEECH MODEL

(71) Applicant: Google Inc., Mountain View, CA (US)

(72) Inventors: Andrew W. Senior, New York, NY (US); Ignacio Lopez Moreno, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/663,610

(22) Filed: Mar. 20, 2015

(65) Prior Publication Data

US 2015/0269931 A1  Sep. 24, 2015

Related U.S. Application Data

(60) Provisional application No. 61/969,426, filed on Mar. 24, 2014.

(51) Int. Cl.
*G10L 15/06* (2013.01)
*G10L 21/00* (2013.01)
*G10L 15/183* (2013.01)

(52) U.S. Cl.
CPC ............. *G10L 15/063* (2013.01); *G10L 15/183* (2013.01); *G10L 2015/0631* (2013.01)

(58) Field of Classification Search
CPC ..... G10L 15/063; G10L 15/22; G10L 13/027; G10L 15/1822; G06F 17/30684
USPC .......... 704/245, 233, 231, E11.003, E15.008, 704/236, E15.04, 243, 256.3, 257, 275; 703/2; 1/1; 706/20; 702/13; 382/103
See application file for complete search history.

(56) References Cited

U.S. PATENT DOCUMENTS

| | | | | |
|---|---|---|---|---|
| 6,615,170 B1 * | 9/2003 | Liu | ........................ | G10L 25/78 704/231 |
| 7,542,901 B2 * | 6/2009 | Dharanipragada | ... | G10L 15/197 704/243 |
| 7,606,714 B2 * | 10/2009 | Williams | ............... | G10L 13/027 379/265.02 |
| 7,725,411 B2 * | 5/2010 | Tian | ........................ | G06K 9/628 382/103 |
| 9,112,984 B2 * | 8/2015 | Sejnoha | ............ | H04M 1/72519 |
| 2011/0066433 A1 * | 3/2011 | Ljolje | ...................... | G10L 15/07 704/236 |
| 2013/0006633 A1 * | 1/2013 | Grokop | .................. | G10L 15/063 704/245 |
| 2014/0025356 A1 * | 1/2014 | Kosko | ...................... | G06F 17/10 703/2 |

OTHER PUBLICATIONS

Beaufays, Francoise et al., "Unsupervised Discovery and Training of Maximally Dissimilar Cluster Models", 2010 Proceedings of Interspeech 4 pages.
Gales, M.J.F., "Cluster Adaptive Training of Hidden Markov Models", Aug. 23, 1999, 21 pages.
(Continued)

*Primary Examiner* — Charlotte M Baker
(74) *Attorney, Agent, or Firm* — Fish & Richardson P.C.

(57) ABSTRACT

Methods, systems, and apparatus, including computer programs encoded on a computer storage medium, for receiving data representing acoustic characteristics of a user's voice; selecting a cluster for the data from among a plurality of clusters, where each cluster includes a plurality of vectors, and where each cluster is associated with a speech model trained by a neural network using at least one or more vectors of the plurality of vectors in the respective cluster; and in response to receiving one or more utterances of the user, providing the speech model associated with the cluster for transcribing the one or more utterances.

20 Claims, 7 Drawing Sheets

(56) References Cited

OTHER PUBLICATIONS

Gauvain, Jean-Luc et al., "Maximum a Posteriori Estimation for Multivariate Gaussian Mixture Observations of Markov Chains", 1994 IEEE Transactions on Speech and Audio Processing, 9 pages.

Liao, Hank, Speaker Adaptation of Context Dependent Deep Neural Networks, 2013 IEEE International Conference on Acoustics, Speech and Signal Processing, 5 pages.

Mao, Mark Z. et al., "Automatic Training Set Segmentation for Multi-Pass Speech Recognition", 2005 IEEE International Conference on Acoustics, Speech and Signal Processing, 4 pages.

* cited by examiner

CLUSTER SPECIFIC SPEECH MODEL

CROSS REFERENCE TO RELATED APPLICATION

This application claims the benefit of U.S. Provisional Application Ser. No. 61/969,426, filed on Mar. 24, 2014, which is incorporated by reference.

TECHNICAL FIELD

This specification describes technologies related to speech recognition.

BACKGROUND

Automatic speech recognition is an important technology that is used in mobile devices and other devices. In general, automatic speech recognition attempts to provide accurate transcriptions of what a person has said.

SUMMARY

According to one innovative aspect of the subject matter described in this specification, acoustic characteristics of users' utterances may be represented as vectors in a vector space. The vector space may be segmented into multiple clusters, where a speech model based on a neural network may be trained for each cluster using vectors in the respective cluster. Acoustic characteristics of a new user's utterance may be represented as a vector in the vector space, and a corresponding cluster may be selected. A speech model associated with the selected cluster may be provided to the user for speech recognition.

In general, one innovative aspect of the subject matter described in this specification can be embodied in methods that include the actions of receiving data representing acoustic characteristics of a user's voice, selecting a cluster for the data from among a plurality of clusters, where each cluster includes a plurality of vectors, and where each cluster is associated with a speech model trained by a neural network using at least one or more vectors of the plurality of vectors in the respective cluster, and in response to receiving one or more utterances of the user, providing the speech model associated with the cluster for transcribing the one or more utterances.

These and other embodiments may each optionally include one or more of the following features. For instance, the plurality of clusters may be segmented based on vector distances to centroids of the clusters. Selecting a cluster for the data may include determining a vector based on the data, determining that a vector distance between the vector and the cluster is a shortest distance compared to vector distances between the vector and other clusters of the plurality of clusters, and based on determining that the vector distance between the vector and the cluster is the shortest distance, selecting the cluster for the vector.

Selecting a cluster for the data may include receiving data indicative of latent variables of multivariate factor analysis of an audio signal of the user, and selecting an updated cluster using the latent variables.

The process may include receiving a feature vector that models audio characteristics of a portion of an utterance of the user, and determining, using the feature vector as an input, a candidate transcription for the utterance based on an output of the neural network of the speech model. Providing the speech model for transcribing the one or more utterances may include providing the speech model to a computing device of the user.

The acoustic characteristics of the user may include a gender of the user, an accent of the user, a pitch of an utterance of the user, background noises around the user, or age group of the user. The data may be an i-vector, and where the neural network may be trained using the i-vectors in the cluster and one or more i-vectors in one or more neighboring clusters. Each cluster may include a distinct plurality of vectors, and each cluster may be associated with a distinct speech model.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Advantageous implementations may include one or more of the following features. Vectors derived from utterances represent a combination of acoustic characteristics of the utterances, and the optimization of a speech model based on these vectors may provide a better recognition of the user's speech than a speech model optimized using a specific acoustic characteristic. If acoustic characteristics of a user are previously known, a speech model may be preselected and provided to the user before the user speaks. Speech models derived from clusters may be more compact in size because the training vectors have been segmented by clusters. A compact speech model may be loaded to a mobile computing device for performing speech recognition directly on the mobile computing device.

The details of one or more implementations are set forth in the accompanying drawings and the description below. Other potential features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
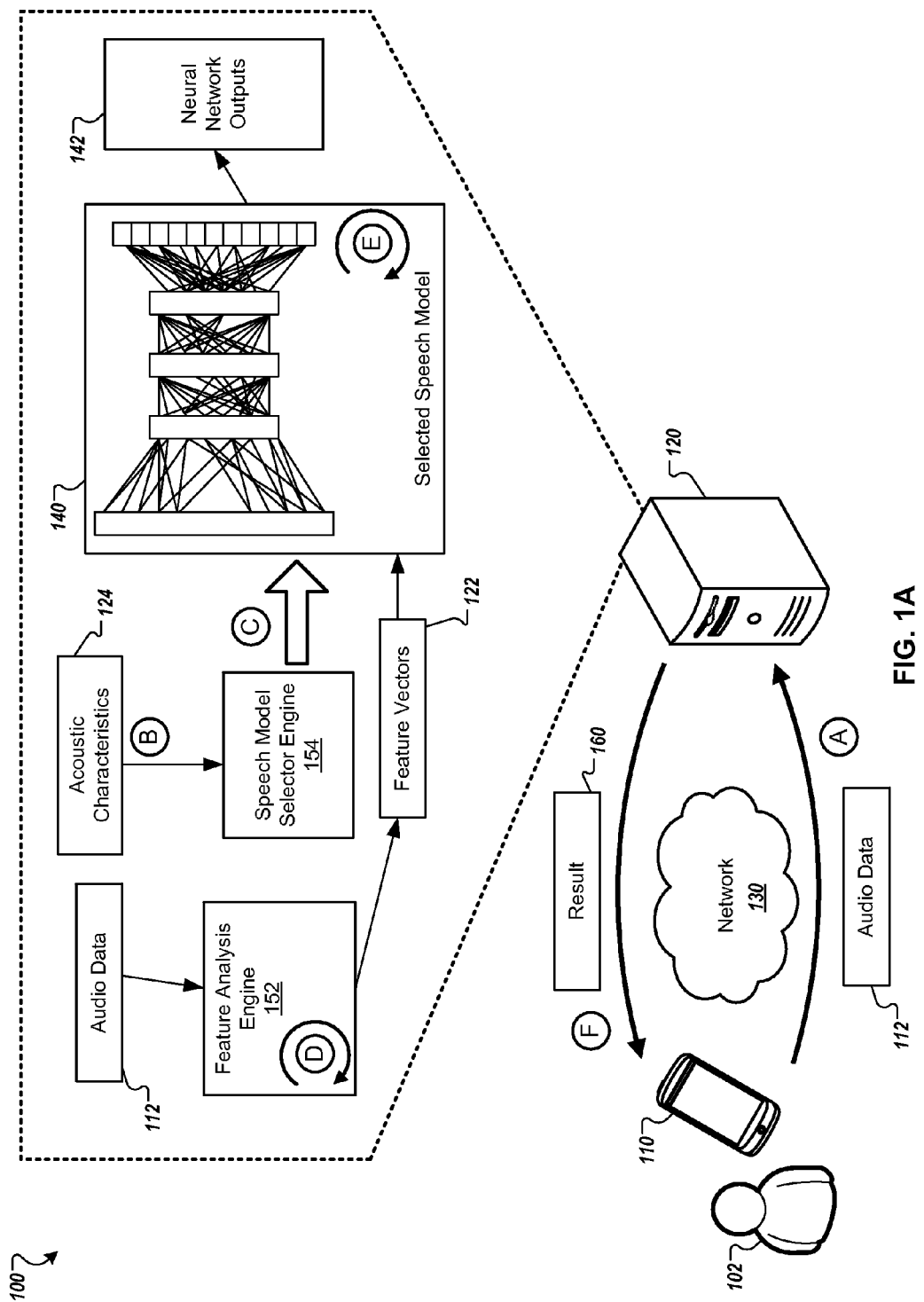
FIG. 1A is a block diagram that illustrates an example of a system for speech recognition using neural networks.

FIG. 1A is a block diagram that illustrates an example of a system 100 for speech recognition using neural networks. Briefly, based on acoustic characteristics of a user, a speech model from among multiple speech models is selected to recognize a user's spoken utterances. The system 100 includes a client device 110, a computing system 120, and a network 130.

In the system 100, the client device 110 can be, for example, a desktop computer, laptop computer, a tablet computer, a wearable computer, a cellular phone, a smart phone, a music player, an e-book reader, a navigation system, or any other appropriate computing device. The functions performed by the computing system 120 can be performed by individual computer systems or can be distributed across multiple computer systems. The network 130 can be wired or wireless or a combination of both and can include the Internet.

In some implementations, the computing system 120 may select a speech model 140 for a user 102 based on data 124 that represents acoustic characteristics, of the user 102. The user 102 may use the client device 110 to communicate with the computing system 120 through the network 130, and use the speech model 140 to recognize one or more utterances spoken by the user 102. The computing system 120 may process the recognized utterances, and send the results back to the client device 110.

Although not shown in FIG. 1, in some other implementations, the computing system 120 may provide the selected speech model 140 to the user device 110. The user 102 may then use the speech model 140 stored at the client device 110 to recognize one or more utterances spoken by the user 102 without reaching out to a remote server, (e.g., the computing system 120), for the speech recognition, and therefore may save communications bandwidth and time.

It is desirable that the size of the speech model 140 be compact because the memory space on the client device 110 may be limited. As described below, the speech model 140 is based on a trained neural network. The neural network may be trained using a subset of training data that have been segmented into multiple clusters based on acoustic characteristics, and may result a more compact model for the client device 110.

FIG. 1 also illustrates an example flow of data, shown in stages (A) to (F). Stages (A) to (F) may occur in the illustrated sequence, or they may occur in a sequence that is different than in the illustrated sequence. In some implementations, one or more of the stages (A) to (F) may occur offline, where the computing system 120 may perform computations when the client device 110 is not connected to the network 130.

During stage (A), the user 102 speaks utterances to the client device 110. The client device 110 records the utterances, and transmits the utterances as audio data 112 to the computing system 120 via the network 130. In some implementations, the utterances may include one or more phrases that are known to the computing system 120. For example, the user 102 may speak a phrase "Hello, phone" that is known to the computing system 120 before speaking the rest of the speech that the user 102 wishes the speech model to process.

During stage (B), the computing system 120 obtains data 124 representing acoustic characteristics of the user 102, and inputs the data 124 to the speech model selector engine 154. In some implementations, the data 124 may be a vector. In some implementations, the data 124 may represent time-independent characteristics of the utterances of the user. For example, the data 124 may be an i-vector that is described further in descriptions of FIG. 3 below.

In some implementations, an i-vector may be a current utterance i-vector derived from the current utterance (e.g., the audio data 112) being recognized. In some implementations, the i-vector may be derived from audio signals other than the audio data 112 containing the utterances being recognized. For example, the i-vector may be derived from a prior utterance of the same speaker whose utterances are included in the audio data 112.

In some implementations, the i-vector may be a speaker i-vector that is pre-computed for a particular speaker using multiple utterances of the speaker (e.g., utterances from multiple different recording sessions, such as recordings on different days). To generate a speaker i-vector, an i-vector can be determined for each utterance in a set of multiple utterances of the speaker. The i-vectors can be averaged together to obtain generate the speaker i-vector. In some implementations, where a speaker i-vector is used rather than an utterance i-vector derived from the utterance being recognized, post processing may discriminative training, such as linear discriminant analysis, to identify attributes that are indicative of speaker characteristics. For example, various techniques can be used to isolate speaker characteristics, independent of noise, room characteristics, and other non-speaker-dependent characteristics.

Unlike an i-vector computed using the audio data 112 being recognized, i-vectors derived from prior utterances may not reflect the particular background noise characteristics of the audio data 112. These i-vectors will indicate characteristics of the speaker's voice and speaking style and are thus useful in recognition. In addition, the noise in prior utterances may be similar to the noise in the current utterance. The speaker i-vector may be calculated from a set recent utterances, such as a predetermined number of most recent utterances or audio acquired within a threshold time period, which may approximate the noise conditions of the current utterance if the recent utterances were recorded in a similar setting.

In some implementations, the computing system 120 may identify the speaker and select an i-vector based on the speaker's identity. An i-vector may be calculated for each of multiple users, and the i-vectors may be stored for later use in recognizing speech of the corresponding users. The computing system 120 may receive a device identifier for a device, such as a mobile phone, that the speaker is using to record speech. In addition, or as an alternative, the computing system 120 may receive a user identifier that identifies the user, such as a name or user account login. The computing system 120 may identify the speaker as a user that owns the device or a user is logged into a user account on the device. In some implementations, the computing system 120 may identify the speaker before recognition begins, or before audio is received during the current session. The computing system 120 may then look up the i-vector that corresponds to the identified user and use that i-vector to recognize received speech.

In some implementations, a successive approximation technique may be used to approximate and re-estimate the i-vector 250 while audio is received. The i-vector 250 may be re-estimated at a predetermined interval, for example, each time a threshold amount of new audio has been received. For example, a first i-vector may be estimated using the initial three seconds of audio received. Then, after another three seconds of audio has been received, a second i-vector may be estimated using the six seconds of audio received so far. After another three seconds, a third i-vector may be estimated using all nine seconds of audio received, and so on. The re-estimation period may occur at longer intervals, such as 10 seconds or 30 seconds, to reduce the amount of computation required. In some implementations, i-vectors are re-estimated at pauses in speech (e.g., as detected by a speech energy or voice activity detection algorithm), rather than at predetermined intervals.

As another example, the data 124 may be a supervector that is described further in descriptions of FIG. 3 below. In some implementations supervector may be a current utterance supervector derived from the current utterance (e.g., the audio data 112) being recognized. In some implementations, the supervector may be derived from audio signals other than the audio data 112 containing the utterances being recognized. In some implementations, the supervector may be a speaker supervector that is pre-computed for a particular speaker using multiple utterances of the speaker. In some implementations, the computing system 120 may identify the speaker and select a supervector based on the speaker's identity.

As another example, the data 124 may be a feature vector that is an output of a hidden layer of a neural network. In some implementations, the system may obtain access to a neural network that has been trained to provide a distinct 1×N feature vector for each of N training speakers. In some implementations, the feature vectors for the different training speakers may be orthogonal to each other. The computing system 120 may input speech features corresponding to an utterance to the neural network, and then obtain a feature vector corresponding to the utterance based on output of a hidden layer of the neural network. For example, a 1×N feature vector may be obtained based on output of a last hidden layer of the neural network. In some implementations, the feature vector may be an average of the multiple feature vectors for multiple utterances.

In some implementations, the data 124 may be obtained using a portion of the audio data 112. For example, the computing system 120 may generate a vector using the known phrase "Hello, phone" spoken by the user 102. In some other implementations, the data may be obtained using a phrase that was previously spoken by the user 102. For example, the computing system 120 may learn the identity of the user 102 by the identity of the client device 110, and may access a phrase that was previously spoken by the user 102, where the phrase was recorded and stored in the computing system 120 or another computing system. As another example, the computing system 120 may learn the identity of the user 102 because the user 102 has logged in the computing system 120 using an identity that is associated with a profile accessible by the computing system 120.

During stage (C), the speech model selector engine 154 selects a speech model 140 for the user 102 based on the data 124. In general, the system 100 includes multiple speech models implemented by neural networks, where each neural network is trained using a different set of vectors representing audio characteristics of training utterances. Briefly, a vector corresponding to the data 124 is projected to a vector space that includes the vectors of training utterances for the multiple speech models. The vector space is segmented into clusters. Depending on which cluster the vector is projected to, a speech model that is associated with the cluster is selected for the user 102. The selection of the speech models is described further in descriptions of FIG. 1B, and the training of the speech models is described further in descriptions of FIG. 1C.

As used in this specification, an "engine" (or "software engine") refers to a software implemented input/output system that provides an output that is different from the input. An engine can be an encoded block of functionality, such as a library, a platform, a Software Development Kit ("SDK"), a software module, or an object.

During stage (D), the audio data 112 is input to a feature analysis engine 152 to determine one or more feature vectors 122 that correspond to the audio data 112. In general, a feature vector 122 indicates audio characteristics during a different portion or window of the audio signal 112. Each feature vector 122 may indicate acoustic properties of, for example, a 10 millisecond (ms), 25 ms, or 50 ms portion of the audio signal 112.

During stage (E), the feature vectors 122 are input in the selected speech model 140. In some implementations, the selected speech model 140 may be implemented using a neural network trained to act as an acoustic model. For example, the speech model 140 indicates likelihoods that feature vectors correspond to different speech units when the feature vectors and certain types of additional information are provided.

The speech model 140 produces neural network outputs 142, which the computing system 120 uses to identify a transcription for the audio signal 112. For example, the computing system 120 may provide the neural network outputs 142 to weighted finite state transducers that approximate a hidden Markov model (HMM), which may include information about a lexicon indicating the phonetic units of words, a grammar, and a language model that indicates likely sequences of words. The output of the HMM can be a word lattice from which the transcription may be derived.

During stage (F), a result 160 is transmitted from the computing system 120 to the client device 110 over the network 130. In some implementations, the computing system 120 may provide the transcription to the client device 110 as the result 160. In some other implementations, the computing system 120 may provide the transcription to another computing system for additional process, and provide the output of the additional process as the result 160. For example, the computing system 120 may provide a transcription to a search engine to perform a search, and return the search results to the user 102.

Figure 1B:
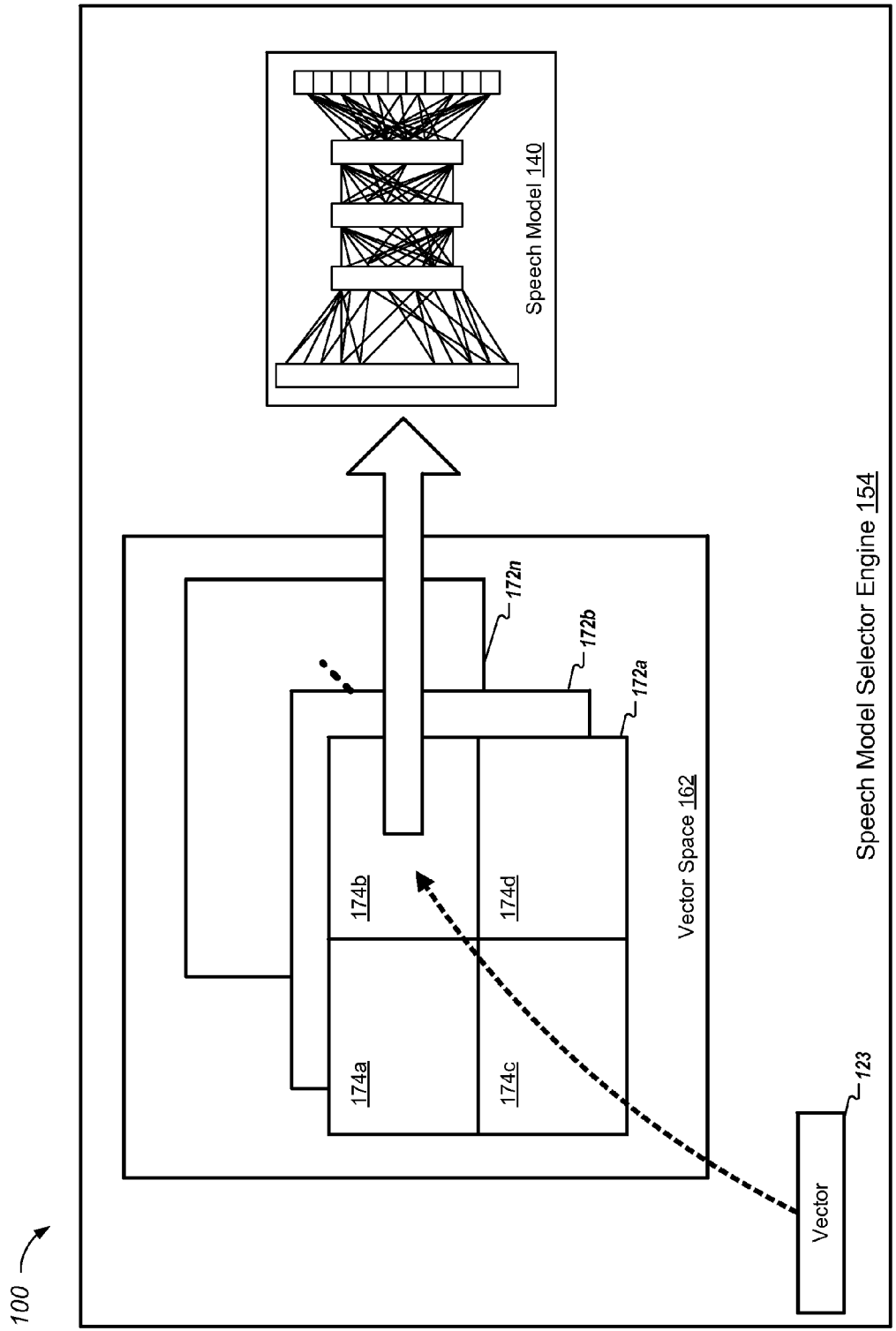
FIG. 1B is a block diagram that illustrates an example of a system for selecting a speech model for a user.

FIG. 1B is a block diagram that illustrates an example of a system 100 for selecting a speech model for a user. In general, training vectors derived from training utterances are used to train neural networks for speech recognition. A training vector has a predetermined dimension, and represents acoustic characteristics of a particular training speaker. Training vectors of training utterances may be mapped to a vector space 162 accessible by the speech model selector engine 154, where the vector space 162 may be segmented into multiple clusters. Because training vectors represent a combination of acoustic characteristics, and are not limited to one specific acoustic or demographic characteristic (e.g., pitch, gender, accent, etc.), the clustering of the training vectors enables grouping of users with similar speech patterns across multiple acoustic characteristics. The training of a neural network for a speech model of a cluster may be performed by the computing system 120, or another computing system not shown here. The optimization of a neural network based on these clustered training vectors may provide a better recognition of the user's speech than a speech model optimized using one specific acoustic characteristic.

In some implementations, the clustering of training vectors may use hierarchical divisive clustering or k-Means. For example, given a predetermined number of cluster centroids in the vector space 162, the vector space 162 may be segmented into the predetermined number of clusters, where each training vector is mapped to a respective cluster according to which centroid is the closest. For example, if the predetermined number is two, the system may segment the training utterances by gender. Here, the vector space 162 is segmented into clusters 172a, 172b, . . . , and 172n. In some implementations, a cluster may be further segmented. For example, the cluster 172a may be segmented into clusters 174a, 174b, 174c, and 174d.

Other known techniques for clustering training vectors may be used. For example, a Gaussian mixture model (GMM) may be used to cluster the training vectors. Given a predetermined number of clusters, the corresponding cluster centroids may be input to a GMM, where a mean value may be generated for each cluster centroid. Each training vector may then be input to the GMM to generate a respective output value. Each training vector may be mapped to a respective cluster according to which mean value associated with a cluster provides the smallest difference to the respective output value of the training vector.

In some implementations, for each cluster, a neural network is trained as a speech model using the training vectors in the cluster. The trained speech model is therefore optimized for the acoustic characteristics represented by the training vectors in the cluster. The speech model trained by training vectors provides an advantage over a speech model trained over a specific acoustic characteristic because training vectors typically represents a combination of acoustic characteristics. The training of a neural network may be implemented by a training algorithm that is described in more details in descriptions of FIG. 2, or by another training algorithm.

The speech model selector engine 154 maps a vector 123 to a cluster in the vector space 162. In some implementations, the vector 123 may be derived from the data 124. In some other implementations, the vector 123 may be the data 124. Here, the vector 123 is mapped to the cluster 174b, and the speech model selector engine 154 selects the speech model 140 corresponding to the cluster 174b for the user 102. In some implementations, the speech model 140 is then used by the computing system 120 to transcribe the user's subsequent utterances. In some other implementations, the speech model 140 may be provided to the client device 110 to transcribe the user's utterances directly on the client device 110.

Figure 1C:
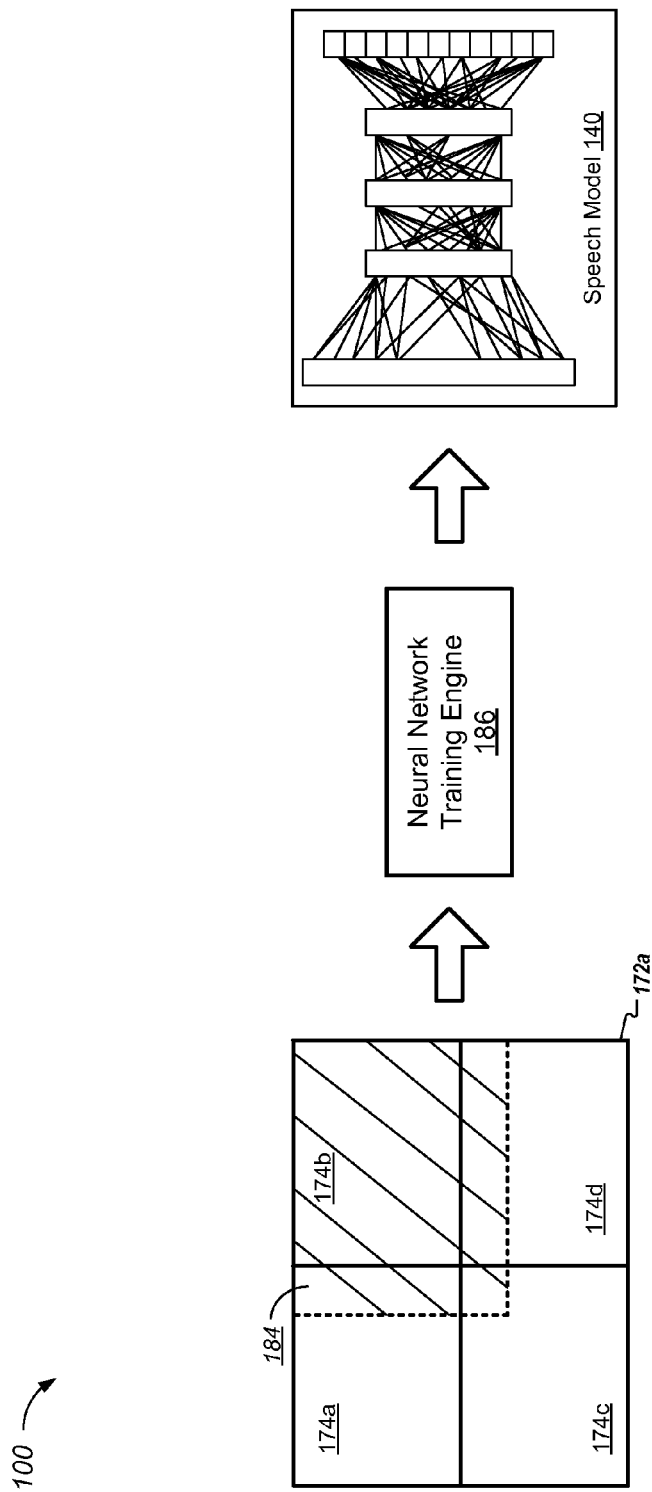
FIG. 1C is a block diagram that illustrates an example of a system for training a speech model based on neural network.

FIG. 1C is a block diagram that illustrates an example of a system 100 for training a speech model based on neural network. As described in FIG. 1B, for each cluster, a neural network is trained as a speech model using the training vectors in the cluster. However, in the event that a vector 123 is mapped near a boundary between two or more clusters in the vector space 162, the trained speech model 140 may not perform well because there may not be sufficient number of training vectors near and within the boundaries of one cluster to provide good training results for vectors that are near the boundaries.

In some implementations, a spilling technique may be used to address this issue. In a spilling technique, in addition to the training vectors in a particular cluster, one or more training vectors in the neighboring clusters of the particular cluster may also be used to train the speech model of the particular cluster. For example, a neural network training engine 186 may train a neural network for a speech model 140 of the cluster 174b by including training vectors that are mapped inside the shaded areas in clusters 174a, 174c, and 174d.

In some implementations, the boundary of the spilling technique may be a predetermined distance to the centroid of the particular cluster. In some other implementations, the boundary of the spilling technique may be determined based on a number of training vectors in the particular cluster. For example, the neural network training engine 186 may determine the boundary of the spilling technique based on a minimum number of training vectors needed to train the speech model. In some implementations, the boundary of the spilling technique may be determined based on a number of training vectors in the neighboring clusters. For example, the neural network training engine 186 may determine the boundary of the spilling technique based on a minimum number of training vectors in the neighboring clusters needed to train the speech model. In some implementations, the boundary of the spilling technique may be determined based on a number of training vectors near the boundary of the particular cluster. For example, the neural network training engine 186 may determine to enable the spilling technique if a number of training vectors within and near the boundary are below a minimum number.

Figure 2:
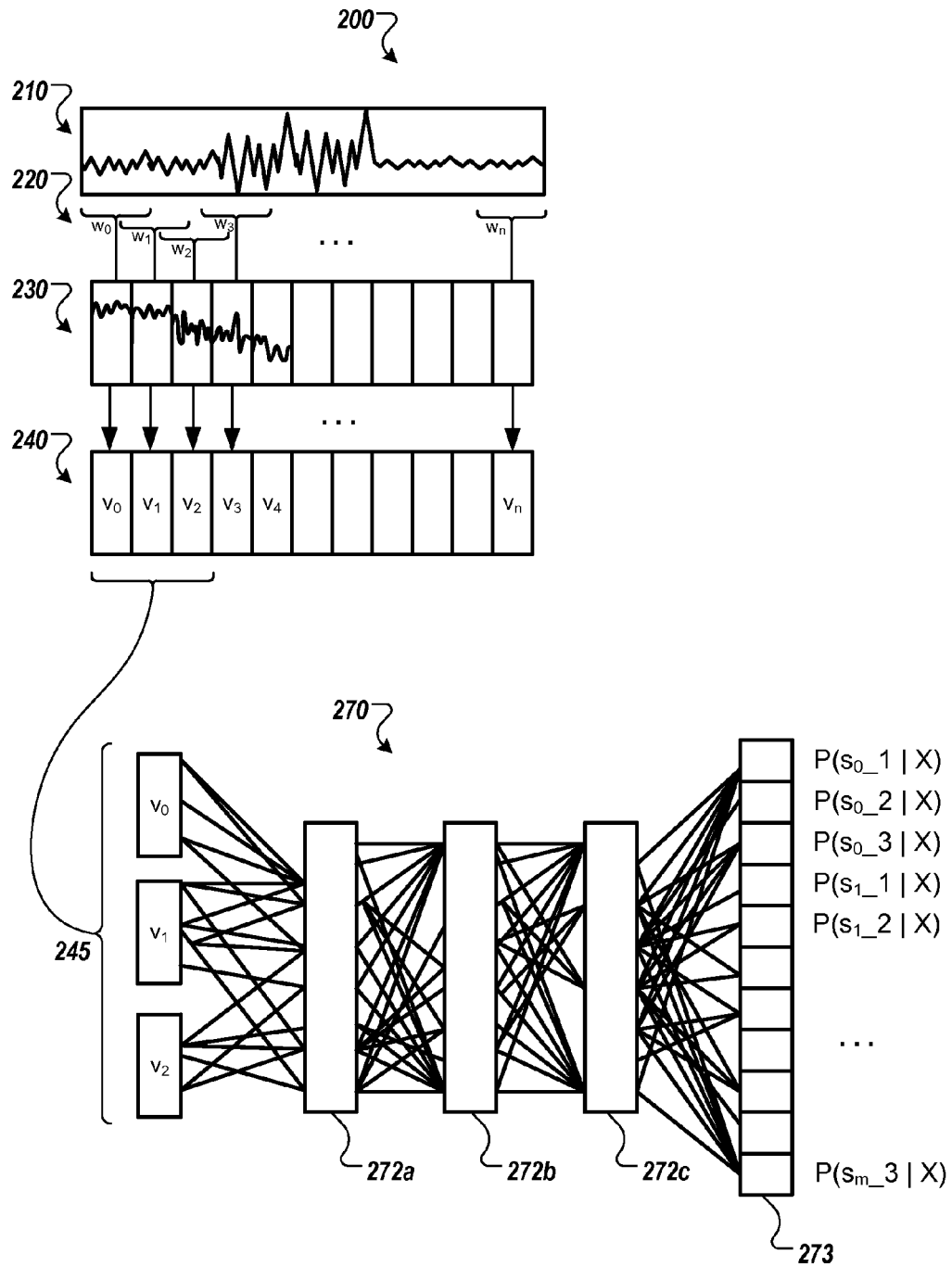
FIG. 2 is a diagram that illustrates an example of processing for speech recognition using neural networks.

FIG. 2 is a diagram 200 that illustrates an example of processing for speech recognition using neural networks. The operations discussed are described as being performed by the computing system 120, but may be performed by other systems, including combinations of multiple computing systems.

The computing system 120 receives data about an audio signal 210 that includes speech to be recognized. The computing system 120 or another system then performs feature extraction on the audio signal 210. For example, the computing system 120 analyzes different segments or analysis windows 220 of the audio signal 210. The windows 220 are labeled $w_0 \ldots w_n$, and as illustrated, the windows 220 can overlap. For example, each window 220 may include 25 ms of the audio signal 210, and a new window 220 may begin every 10 ms. For example, the window 220 labeled $w_0$ may represent the portion of audio signal 210 from a start time of 0 ms to an end time of 25 ms, and the next window 220, labeled $w_1$, may represent the portion of audio signal 120 from a start time of 10 ms to an end time of 35 ms. In this manner, each window 220 includes 15 ms of the audio signal 210 that is included in the previous window 220.

The computing system 120 performs a Fast Fourier Transform (FFT) on the audio in each window 220. The results of the FFT are shown as time-frequency representations 230 of the audio in each window 220. From the FFT data for a window 220, the computing system 120 extracts features that are represented as an acoustic feature vector 240 for the window 220. The acoustic features may be determined by binning according to filterbank energy coefficients, using a mel-frequency ceptral component (MFCC) transform, using a perceptual linear prediction (PLP) transform, or using other techniques. In some implementations, the logarithm of the energy in each of various bands of the FFT may be used to determine acoustic features.

The acoustic feature vectors 240, labeled $v_1 \ldots v_n$, include values corresponding to each of multiple dimensions. As an example, each acoustic feature vector 240 may include a value for a PLP feature, a value for a first order temporal difference, and a value for a second order temporal difference, for each of 13 dimensions, for a total of 39 dimensions per acoustic feature vector 240. Each acoustic feature vector 240 represents characteristics of the portion of the audio signal 210 within its corresponding window 220.

The computing system 120 uses a neural network 270 that can serve as a speech model and indicate likelihoods that acoustic feature vectors 240 represent different phonetic units. The neural network 270 includes an input layer 271, a number of hidden layers 272a-272c, and an output layer 273. The neural network 270 may receive acoustic feature vectors as input.

The neural network 270 has been trained to estimate likelihoods that the feature vectors represent particular phonetic units. For example, during training, input to the neural network 270 may be a combination of acoustic feature vectors corresponding to the utterance from which the acoustic feature vectors were derived. Many inputs combining acoustic feature vectors can be used to train the neural network 270, and the various training data sets can include acoustic feature vectors derived from utterances from multiple speakers.

To recognize speech in the audio signal 210 using the neural network 270, the computing system 120 inputs the different sets of acoustic feature vectors 240 at the input layer 271 of the neural network 270. In the example, the neural network 270 receives a set 245 of acoustic feature vectors 240 that includes (i) an acoustic feature vector 240 for a window 220 of speech to be recognized and (ii) one or more acoustic feature vectors 240 that serve as context. The set 245 can include acoustic feature vectors 240 corresponding to a predefined number of consecutive windows 220. In the example, the set 245 includes the acoustic feature vector 240 labeled $v_1$, which indicates features of audio in the window 220 labeled $w_1$. As context for this feature vector, the set 245 also includes the acoustic feature vectors 240 labeled $v_0$ and $v_2$, which respectively indicate features of audio in the windows 220 immediately preceding and immediately following the window 220 labeled $w_1$. The set 245 of acoustic feature vectors 240 are concatenated or stacked together to form the complete input to the neural network 270.

At the output layer 273, the neural network 270 indicates likelihoods that the speech in the window 220 under analysis (e.g., the window $w_1$ corresponding to acoustic feature vector $v_1$) corresponds to specific phonetic units. In some implementations, the phonetic units used may be phones or components of phones. In the example, the potential phones are referred to as $s_0 \ldots s_m$. The phones may be any of the various phones in speech, such as an "ah" phone, an "ae" phone, a "zh" phone, and so on. The phones $s_0 \ldots s_m$ may include all of the possible phones that may occur in the audio signal 210, or fewer than all of the phones that may occur. Each phone can be divided into three acoustic states.

The output layer 273 provides predictions or probabilities of acoustic states given the data at the input layer 271. The output layer 273 can provide a value, for each state of each phone, that indicates the probability that the acoustic feature vector $v_1$ represents the particular state of the particular phone. For example, for a first phone, $s_0$, the output layer 273 can provide a first value that indicates a probability $P(s_0\_1|X)$, which indicates a probability that the window $w_1$ includes the first acoustic state of the $s_0$ phone, given the set of input, X, provided at the input layer 271. For a first phone, $s_1$, the output layer 273 can provide a second value indicating a probability $P(s_0\_2|X)$, indicating a probability that the window $w_1$ includes the second acoustic state of the $s_0$ phone, given the set of input, X, provided at the input layer 271. Similar outputs can be provided for all states of all of the phones $s_0 \ldots s_m$.

The computing system 120 provides different sets of acoustic feature vectors 240 to the neural network 270 to receive predictions or probabilities of the acoustic states in the different windows 220. The computing system 120 may apply a sliding window to the acoustic feature vectors 240 to select different sets. In the example, the sliding window has a size of three acoustic feature vectors 240. For example, the computing system 120 may provide acoustic feature vectors 240 $v_1$, $v_2$, and $v_3$ as input to the neural network 270 to obtain output values regarding the speech in window $w_2$. The computing system 120 may provide acoustic feature vectors 240 $v_2$, $v_3$, and $v_4$ as input to the neural network 270 to obtain output values regarding the speech in the window $w_3$. In this manner, the computing system 120 may obtain outputs corresponding to each position of the sliding window across the acoustic feature vectors 240.

The output of the neural network 270 is provided to a set of weighted finite state transducers that represents a language model composed with context information, a lexicon, and a grammar. The set of weighted finite state transducers can approximate an HMM. The weighted finite state transducers output a word lattice that the computing system 120 can use to determine a transcription for the audio signal.

As indicated above, each output from the neural network 270 can include a posterior probability P(state|X), representing a likelihood of a particular acoustic state given the current set of input data, X. In some implementations, the computing system 120 divides the posterior, P(state|X) by the prior, P(state), to generate a scaled posterior probability for each output. The resulting scaled posterior probabilities are then input to the weighted finite state transducers for further processing.

In the example of FIG. 2, the sliding window of acoustic feature vectors 240 includes three acoustic feature vectors 240. More or fewer acoustic feature vectors 240 may be provided in each set of input to the neural network 270. For example, 2, 3, 5, 10, or another number of feature vectors for windows 220 before and after a central vector may be input simultaneously to the neural network 270.

Figure 3:
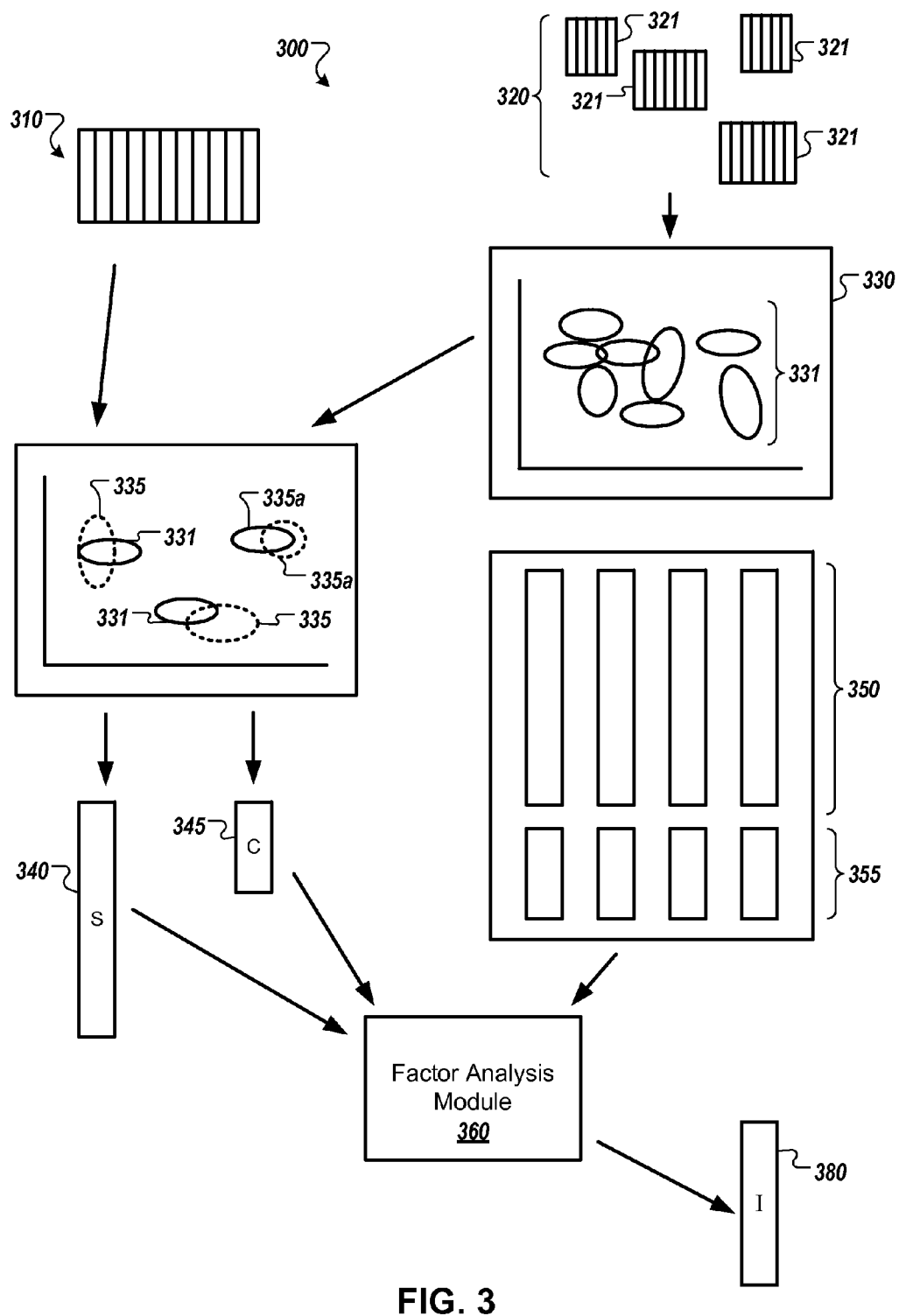
FIG. 3 is a diagram that illustrates an example of processing to generate an i-vector.

FIG. 3 is a diagram 300 that illustrates an example of processing to generate an i-vector. I-vectors are time-independent components that represent overall characteristics of an audio signal rather than characteristics at a specific segment of time within an utterance. I-vectors can summarize a variety of characteristics of audio that are independent of the phonetic units spoken, for example, information indicative of the identity of the speaker, the language spoken, recording channel properties, and noise characteristics.

The example of FIG. 3 illustrates processing to calculate an i-vector 380 for a sample utterance 310. The computing system 120 accesses training data 320 that includes a number of utterances 321. The training data 320 may include utterances 321 including speech from different speakers, utterances 321 having different background noise conditions, and utterances 321 having other differences. Each of the utterances 321 is represented as a set of acoustic feature vectors. Each of the acoustic feature vectors can be, for example, a 39-dimensional vector determined in the same manner that the acoustic feature vectors 240 are determined in the example of FIG. 2.

The computing system 120 uses the utterances 321 to train a Gaussian mixture model (GMM) 330. For example, the GMM 330 may include 1000 39-dimensional Gaussians 331. The GMM 330 is trained using the acoustic feature vectors of the utterances 321 regardless of the phones or acoustic states that the acoustic feature vectors represent. As a result, acoustic feature vectors corresponding to different phones and acoustic states are used to train the GMM 330. For example, all of the acoustic feature vectors from all of the utterances 321 in the training data 320 can be used to train the GMM 330. In this respect, the GMM 330 is different from GMMs that are trained with only the acoustic feature vectors for a single phone or a single acoustic state.

When the sample utterance 310 is received, the computing system 120 determines acoustic feature vectors that describe the utterance 310. The computing system 120 classifies the acoustic feature vectors of the utterance 310 using the GMM 330. For example, the Gaussian 331 that corresponds to each acoustic feature vector of the sample utterance 310 may be identified. The computing system 120 then re-estimates the Gaussians 331 that are observed in the sample utterance 310, illustrated as re-estimated Gaussians 335 shown in dashed lines. As an example, a set of one or more acoustic feature vectors of the sample utterance 310 may be classified as matching a particular Gaussian 331a from the GMM 330. Based on this set of acoustic feature vectors, the computing system 120 calculates a re-estimated Gaussian 335a having a mean and/or variance different from the Gaussian 331a. Typically, only some of the Gaussians 331 in the GMM 330 are observed in the sample utterance 310 and re-estimated.

The computing system 120 then identifies differences between the Gaussians 331 and the corresponding re-estimated Gaussians 335. For example, the computing system 120 may generate difference vectors that each indicate changes in parameters between a Gaussian 331 and its corresponding re-estimated Gaussian 335. Since each of the Gaussians is 39-dimensional, each difference vector can have 39 values, where each value indicates a change in one of the 39 dimensions.

The computing system 120 concatenates or stacks the difference vectors to generate a supervector 340. Because only some of the Gaussians 331 were observed and re-estimated, a value of zero (e.g., indicating no change from the original Gaussian 331) is included in the supervector 340 for each the 39 dimensions of each Gaussian 331 that was not observed in the sample utterance 310. For a GMM 330 having 1000 Gaussians that are each 39-dimensional, the supervector 340 would include 39,000 elements. In many instances, Gaussians 331 and the corresponding re-estimated Gaussians 335 differ only in their mean values. The supervector 340 can represent the differences between the mean values of the Gaussians 331 and the mean values of the corresponding re-estimated Gaussians 335.

In addition to generating the supervector 340, the computing system 120 also generates a count vector 345 for the utterance 310. The values in the count vector 345 can represent $0^{th}$ order Baum-Welch statistics, referred to as counts or accumulated posteriors. The count vector 345 can indicate the relative importance of the Gaussians 331 in the GMM 330. The count vector 345 includes a value for each Gaussian 331 in the GMM 330. As a result, for a GMM 330 having 1000 Gaussians, the count vector 345 for the utterance 310 would include 1,000 elements. Each value in the vector 345 can be the sum of the posterior probabilities of the feature vectors of the utterance 310 with respect to a particular Gaussian 331. For example, for a first Gaussian 331a, the posterior probability of each feature vector in the utterance 310 is computed (e.g., the probability of occurrence of the feature vector as indicated by the first Gaussian 331a). The sum of the posterior probabilities for the feature vectors in the utterance 310 is used as the value for the first Gaussian 331a in the count vector 345. Posterior probabilities for the each feature vector in the utterance 310 can be calculated and summed for each of the other Gaussians 331 to complete the count vector 345.

In the same manner that the supervector 340 and count vector 345 was generated for the sample utterance 310, the computing system 120 generates a supervector 350 and a count vector 355 for each of the utterances 321 in the training data 320. The GMM 330, the supervectors 350, and the count vectors 355 may be generated and stored before receiving the sample utterance 310. Then, when the sample utterance 310 is received, the previously generated GMM 330, supervectors 350, and count vectors can be accessed from storage, which limits the amount of computation necessary to generate an i-vector for the sample utterance 310.

The computing system 120 uses the supervectors 350 to create a factor analysis module 360. The factor analysis module 360, like the GMM 330 and the supervectors 350, may be generated in advance of receiving the sample utterance 310. The factor analysis module 360 can perform multivariate factor analysis to project a supervector to a lower-dimensional vector that represents particular factors of interest. For example, the factor analysis module may project a supervector of 39,000 elements to a vector of only a few thousand elements or only a few hundred elements.

The factor analysis module 360, like the GMM 330, is trained using a collection of utterances, which may be the utterances in the same training data 320 used to generate the GMM 330. An adapted or re-estimated GMM may be determined for each of the i utterances $[U_1, U_2, \ldots, U_i]$ in the training data 320, in the same manner that the re-estimated Gaussians 335 are determined for the utterance 310. A supervector 350 $[S_1, S_2, \ldots, S_i]$ and count vector 355 $[C_1, C_2, \ldots, C_i]$ for each utterance $[U_1, U_2, \ldots, U_i]$ is also determined. Using the vector pairs $[S_i, C_i]$ for each utterance, the factor analysis module 360 is trained to learn the common range of movement of the adapted or re-estimated GMMs for the utterances $[U_1, U_2, \ldots, U_i]$ relative to the general GMM 330. Difference parameters between re-estimated GMMs and the GMM 330 are then constrained to move only over the identified common directions of movement in the space of the supervectors. Movement is limited to a manifold, and the variables that describe the position of the difference parameters over the manifold are denoted as i-vectors. As a result, the factor analysis module 360 learns a correspondence $[S_i, C_i] \rightarrow$ i-vector, such that $S_i/C_i = f(\text{i-vector}_i)$, where $f(\,)$ is a linear function $f(x) = T^*x$ and $T$ is a matrix.

The computing system 120 inputs the supervector 340 and count vector 345 for the sample utterance 310 to the trained factor analysis module 360. The output of the factor analysis module 360 is the i-vector 380, which includes latent variables of multivariate factor analysis. The i-vector 380 represents time-independent characteristics of the sample utterance 310 rather than characteristics of a particular window or subset of windows within the sample utterance 310. In some implementations, the i-vector 380 may include, for example, approximately 300 elements.

Figure 4:
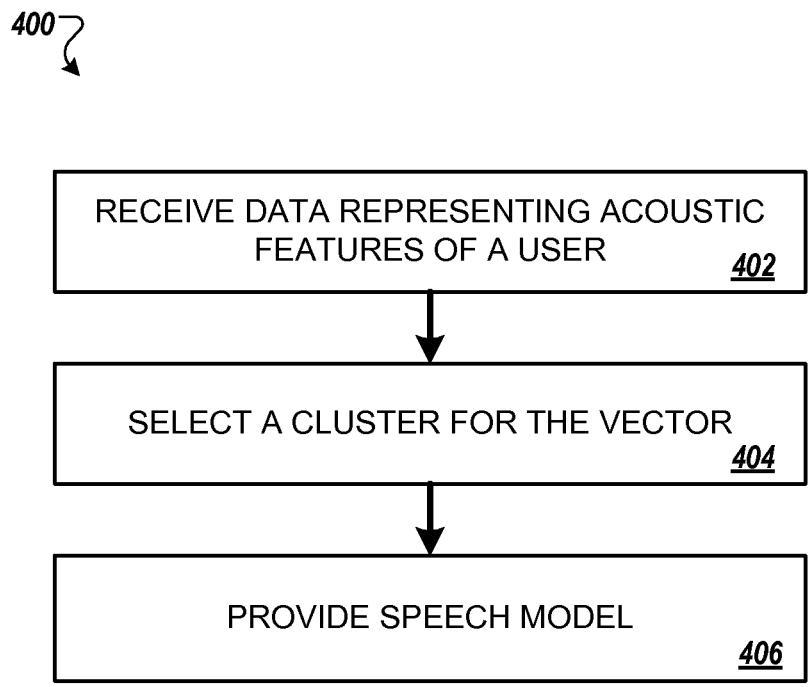
FIG. 4 is a flow diagram that illustrates an example of a process for providing a speech model based on acoustic characteristics of a user.

FIG. 4 is a flow diagram that illustrates an example of a process 400 for speech recognition using neural networks. The process 400 may be performed by data processing apparatus, such as the computing system 120 described above or another data processing apparatus.

The system receives data representing acoustic characteristics of a user's voice (402). The acoustic characteristics of the user may include a gender of the user, an accent of the user, a pitch of an utterance of the user, background noises around the user, or age group of the user. In some implementations, the data may be a vector.

The system selects a cluster for the data among a plurality of clusters (404). In some implementations, each cluster includes a plurality of vectors, where each cluster is associated with a speech model trained by a neural network using at least one or more vectors of the plurality of vectors in the respective cluster. In some implementations, the system may determine a vector based on the data. In some other implementations, the data may be a vector. In some implementations, the vector may be an i-vector, where the neural network may be trained using the i-vectors in the cluster. In addition, the neural network may also be trained using one or more i-vectors in one or more neighboring clusters.

In some implementations, the plurality of clusters may be segmented based on vector distances to centroids of the clusters. The system may determine that a vector distance between the vector and the cluster is a shortest distance compared to vector distances between the vector and other clusters of the plurality of clusters. The system may select the cluster for the vector based on determining that the vector distance between the vector and the cluster is the shortest distance.

In some implementations, the system may receive data indicative of latent variables of multivariate factor analysis of an audio signal of the user. The system may select an updated cluster using the latent variables. For example, an i-vector indicates latent variables of multivariate factor analysis.

In some implementations, each cluster may include a distinct plurality of vectors, where each cluster is associated with a distinct speech model. In some other implementations, one or more clusters may include overlapping vectors.

In response to receiving one or more utterances of the user, the system provides the speech model associated with the cluster for transcribing the one or more utterances (406). In general, the selected speech model is implemented using a neural network trained to act as an acoustic model. For example, the speech model indicates likelihoods that feature vectors correspond to different speech units when the feature vectors and certain types of additional information are provided.

The speech model produces neural network outputs, which the system uses to identify a transcription for the audio signal. For example, the system may provide the neural network outputs to, for example, weighted finite state transducers that approximate a hidden Markov model (HMM), which may include information about a lexicon indicating the phonetic units of words, a grammar, and a language model that indicates likely sequences of words. The output of the HMM can be a word lattice from which the transcription may be derived.

In some implementations, the system may receive a feature vector that models audio characteristics of a portion of an utterance of the user. The system may determine, using the feature vector as an input, a candidate transcription for the utterance based on an output of the neural network of the speech model.

In some implementations, the system may provide the speech model to a computing device of the user. In some implementations, the system may provide the transcription to the client device. In some other implementations, the system may provide the transcription to another computing system for additional process, and provide the output of the additional process as the result. For example, the system may provide a transcription to a search engine to perform a search, and return the search results to the user.

Figure 5:
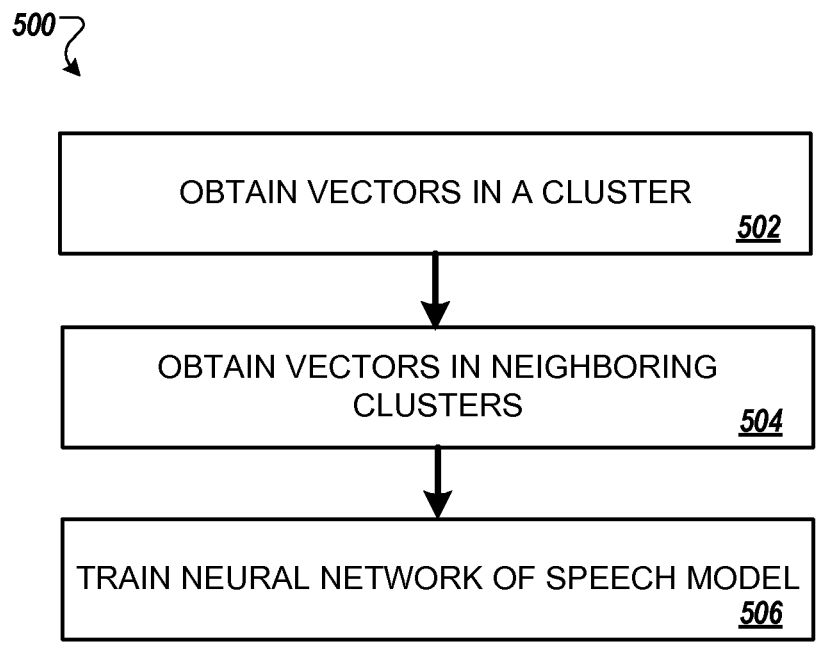
FIG. 5 is a flow diagram that illustrates an example of a process for training a neural network of a speech model associated with a cluster.

FIG. 5 is a flow diagram that illustrates an example of a process 500 for training a neural network. The process 500 may be performed by data processing apparatus, such as the computing system 120 described above or another data processing apparatus.

The system obtains vectors in a cluster (502). In some implementations, the clustering of vectors may use hierarchical divisive clustering or k-Means. For example, given a predetermined number of cluster centroids in a vector space, the vector space may be segmented into the predetermined number of clusters, where each training vector is mapped to a respective cluster according to which centroid is the closest. In some implementations, the clustering of vectors may use GMM or other clustering techniques.

The system obtains vectors in neighboring clusters (504). In some implementations, in addition to the training vectors in a particular cluster, one or more training vectors in the neighboring clusters of the particular cluster may also be used to train the speech model of the particular cluster.

In some implementations, the system may determine the boundary of the spilling technique using a predetermined distance to the centroid of the particular cluster. In some implementations, the system may determine the boundary of the spilling technique based on a number of training vectors in the particular cluster. In some implementations, the system may determine the boundary of the spilling technique based on a number of training vectors in the neighboring clusters. In some implementations, the system may determine the boundary of the spilling technique based on a number of training vectors near the boundary of the particular cluster.

The system trains a neural network of a speech model of the cluster (506). The trained speech model is therefore optimized for the acoustic characteristics represented by the vectors in the cluster and the one or more vectors in the neighboring clusters.

FIG. 6 shows an example of a computing device 600 and a mobile computing device 650 that can be used to implement the techniques described here. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 506, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a microdrive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680.

It may also be implemented as part of a smart-phone 682, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. A method comprising:
receiving data representing acoustic characteristics of a user's voice;
selecting a cluster for the data from among a plurality of clusters, wherein each cluster includes a plurality of vectors, and wherein each cluster is associated with a speech model trained by a neural network using at least one or more vectors of the plurality of vectors in the respective cluster; and
in response to receiving one or more utterances of the user, providing the speech model associated with the cluster for transcribing the one or more utterances.

2. The method of claim 1,
wherein the plurality of clusters are segmented based on vector distances to centroids of the clusters, and
wherein selecting a cluster for the data comprises:
determining a vector based on the data;
determining that a vector distance between the vector and the cluster is a shortest distance compared to vector distances between the vector and other clusters of the plurality of clusters; and
based on determining that the vector distance between the vector and the cluster is the shortest distance, selecting the cluster for the vector.

3. The method of claim 1, wherein selecting a cluster for the data further comprises:
receiving data indicative of latent variables of multivariate factor analysis of an audio signal of the user; and
selecting an updated cluster using the latent variables.

4. The method of claim 1, comprising:
receiving a feature vector that models audio characteristics of a portion of an utterance of the user; and
determining, using the feature vector as an input, a candidate transcription for the utterance based on an output of the neural network of the speech model.

5. The method of claim 1, wherein providing the speech model for transcribing the one or more utterances comprises providing the speech model to a computing device of the user.

6. The method of claim 1, wherein the acoustic characteristics of the user includes a gender of the user, an accent of the user, a pitch of an utterance of the user, background noises around the user, or age group of the user.

7. The method of claim 1, wherein the data is an i-vector, and wherein the neural network is trained using the i-vectors in the cluster and one or more i-vectors in one or more neighboring clusters.

8. The method of claim 1, wherein each cluster includes a distinct plurality of vectors, and wherein each cluster is associated with a distinct speech model.

9. A non-transitory computer-readable medium storing software having stored thereon instructions, which, when executed by one or more computers, cause the one or more computers to perform operations of:

receiving data representing acoustic characteristics of a user's voice;
selecting a cluster for the data from among a plurality of clusters, wherein each cluster includes a plurality of vectors, and wherein each cluster is associated with a speech model trained by a neural network using at least one or more vectors of the plurality of vectors in the respective cluster; and
in response to receiving one or more utterances of the user, providing the speech model associated with the cluster for transcribing the one or more utterances.

10. The non-transitory computer-readable medium of claim 9,
wherein the plurality of clusters are segmented based on vector distances to centroids of the clusters, and
wherein selecting a cluster for the data comprises:
determining a vector based on the data;
determining that a vector distance between the vector and the cluster is a shortest distance compared to vector distances between the vector and other clusters of the plurality of clusters; and
based on determining that the vector distance between the vector and the cluster is the shortest distance, selecting the cluster for the vector.

11. The non-transitory computer-readable medium of claim 9, wherein selecting a cluster for the data further comprises:
receiving data indicative of latent variables of multivariate factor analysis of an audio signal of the user; and
selecting an updated cluster using the latent variables.

12. The non-transitory computer-readable medium of claim 9, wherein the operations comprise:
receiving a feature vector that models audio characteristics of a portion of an utterance of the user; and
determining, using the feature vector as an input, a candidate transcription for the utterance based on an output of the neural network of the speech model.

13. The non-transitory computer-readable medium of claim 9, wherein providing the speech model for transcribing the one or more utterances comprises providing the speech model to a computing device of the user.

14. The non-transitory computer-readable medium of claim 9, wherein the data is an i-vector, and wherein the neural network is trained using the i-vectors in the cluster and one or more i-vectors in one or more neighboring clusters.

15. A system comprising:
one or more processors and one or more computer storage media storing instructions that are operable, when executed by the one or more processors, to cause the one or more processors to perform operations comprising:
receiving data representing acoustic characteristics of a user's voice;
selecting a cluster for the data from among a plurality of clusters, wherein each cluster includes a plurality of vectors, and wherein each cluster is associated with a speech model trained by a neural network using at least one or more vectors of the plurality of vectors in the respective cluster; and
in response to receiving one or more utterances of the user, providing the speech model associated with the cluster for transcribing the one or more utterances.

16. The system of claim 15,
wherein the plurality of clusters are segmented based on vector distances to centroids of the clusters, and
wherein selecting a cluster for the data comprises:
determining a vector based on the data;

determining that a vector distance between the vector and the cluster is a shortest distance compared to vector distances between the vector and other clusters of the plurality of clusters; and based on determining that the vector distance between the vector and the cluster is the shortest distance, selecting the cluster for the vector.

17. The system of claim 15, wherein selecting a cluster for the data further comprises:

receiving data indicative of latent variables of multivariate factor analysis of an audio signal of the user; and selecting an updated cluster using the latent variables.

18. The system of claim 15, wherein the operations comprise:

receiving a feature vector that models audio characteristics of a portion of an utterance of the user; and determining, using the feature vector as an input, a candidate transcription for the utterance based on an output of the neural network of the speech model.

19. The system of claim 15, wherein providing the speech model for transcribing the one or more utterances comprises providing the speech model to a computing device of the user.

20. The system of claim 15, wherein the data is an i-vector, and wherein the neural network is trained using the i-vectors in the cluster and one or more i-vectors in one or more neighboring clusters.

* * * * *